Patented Nov. 16, 1948

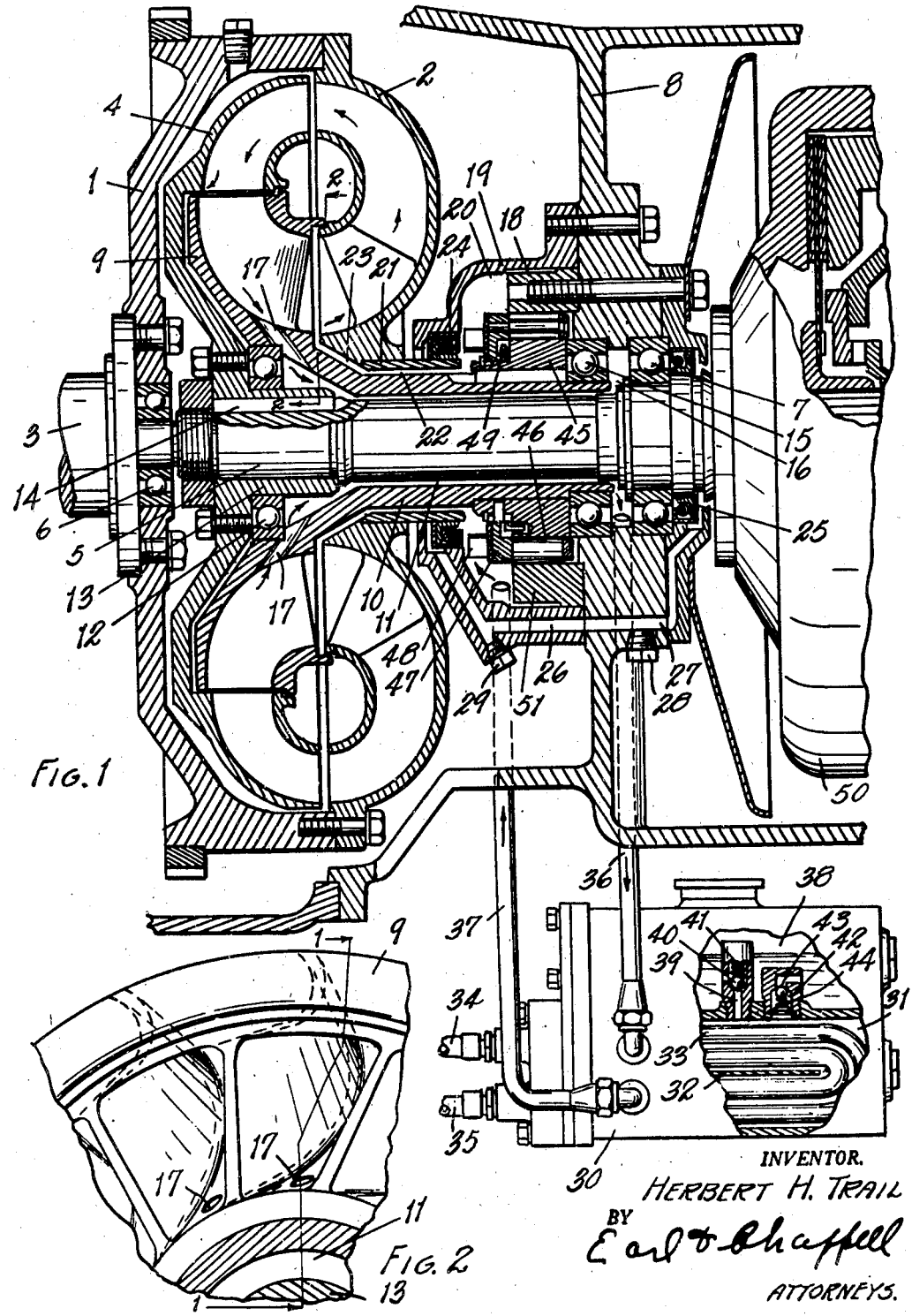

2,453,877

UNITED STATES PATENT OFFICE 2,453,877

HYDRAULIC TORQUE CONVERTER OF THE CONVERTER COUPLING TYPE

Herbert H. Trail, Kalamazoo, Mich., assignor to Fuller Manufacturing Company, Kalamazoo, Mich.

Application July 10, 1944, Serial No. 544,275

1 Claim. (Cl. 60—54)

This invention relates to improvements in hydraulic torque converter of the converter coupling type.

The main objects of this invention are:

First, to provide a hydraulic torque converter of the converter coupling type in which the fluid is effectively circulated through a cooling unit without the aid of a separate pump.

Second, to provide a structure in which adequate oil channels are provided, unobstructed by bearings, and in which the fluid is subjected to a minimum of agitation or turbulence as it flows to and from the unit.

Third, to provide a unit of the hydraulic converter coupling type which effectively functions as a pump for the circulation of the fluid.

Fourth, to provide a structure having these advantages which is quite simple and economical in its parts and one which is compact.

Further objects relating to details and economies of the invention will definitely appear from the description to follow. The invention is defined in the claim.

A structure which embodies the features of the invention is clearly illustrated in the accompanying drawing, in which:

Fig. 1 is a fragmentary view mainly in section on a line corresponding to line 1—1 of Fig. 2 of a structure embodying the features of my invention.

Fig. 2 is an enlarged fragmentary view in section on line 2—2 of Fig. 1.

In the accompanying drawing I represents the flywheel to which the vaned driving member 2 is secured. 3 represents the crank shaft or source of power. The driven member 4 is mounted on the main or driven shaft 5 which is supported at its front end by the bearing 6 and at its rear end by the bearing 7 on the housing 8. The reaction member 9 is provided with a tubular shaft 10 concentrically disposed relative to the shaft 5 and spaced therefrom to provide an annular fluid passage 11. The front ends of the shaft and the reaction member are supported by the bearing 12 carried by the hub 13 on the driven member which is splined at 14 to the shaft 5. The rear end of the shaft 10 is supported by the bearing 15 carried by the housing 8 and spaced from the bearing 7 to provide an annular fluid space 16 communicating with and to which the passage 11 delivers. The members 2, 4 and 9 are of the vane type and in operation set up a vortex as is understood in the art.

The reaction member is provided with ports 17 disposed between the vanes thereof and in the zone of the greatest pressure differential of the vortex so that the fluid is effectively driven through these ports into the annular passage 11. In the embodiment illustrated the reaction member is provided with an overrunning clutch designated generally by the numeral 18 which is provided with a housing 19 having a fluid chamber 20 therein. The sleeve 21 carried by the driving member 2 is disposed in concentric relation to the shaft 10 providing an annular passage 22 connecting the chamber 20 with the inlet 23 of the driving member 2 of the torque converter members. A packing 24 is provided between the housing 19 and the sleeve 21, and a packing 25 is provided at the rear of the bearing 7. A drain channel 26 is provided in the housing 19. The housing 8 has a drain channel 27 communicating with the channel 26. The channels or passages are provided with drain plugs 28 and 29.

The cooling unit 30 is provided with a cooling chamber 31 having a horizontal portion 32 therein and coils 33 connected by the conduits 34 and 35 to the cooling source of the motor or other source of cooling fluid as is convenient. The discharge space 16 is connected to the cooling chamber of the cooling unit by the conduit 36 while the cooling chamber 31 is connected to the chamber 20 by the conduit 37. It will be understood that the cooling unit and its connections as described are shown somewhat conventionally.

The cooling unit is provided with an expansion chamber 38 which is connected to the chamber 31 by the passage 39 having a valve 40 urged to its seat by the spring 41. This expansion chamber is also connected to the cooling chamber by means of the passage 42 having a valve 43 urged to its seat by the spring 44. The spring 41 is designed to yield under expansion pressure resulting from the heating of the fluid while the spring of the valve 43 is of substantially less strength and is designed to yield when a partial vacuum results in the system from the cooling of the fluid.

In the embodiment illustrated the one way brake unit sometimes termed an overrunning clutch unit is that of my copending application filed July 10, 1944, Serial No. 544,277, now Patent No. 2,392,013, and includes a fixed race member 51, a cam member 45 secured to the shaft 10 and coacting rollers 46 provided with a cage 47. This cage has vanes 48 thereon which rotate within the fluid in the chamber 20, serving to retard the cage against the action of the spring indicated at 49. This results in minimizing frictional wear on the parts and also the heating of the parts incident to such frictional wear. Associated with the torque converter is a clutch unit 50, a fragment of which is shown.

With the parts arranged as illustrated and described, with the ports 17 located between the vanes of the reaction member and within the zone of the greatest vortex pressures the fluid is effectively discharged and forced through the circulating system. The parts are arranged to provide a substantially free unobstructed passage for the fluid and the fluid is not forced or compelled to flow through bearings as is frequently the case in structures of this kind. The free open passages facilitate the flow of the fluid and minimize the turbulence to which the fluid is subjected in its flow through the system.

I have illustrated and described my invention in a highly practical and satisfactory embodiment thereof. I have not attempted to illustrate or describe other embodiments and adaptations as it is believed this disclosure will enable those skilled in the art to embody or adapt my invention as may be desired.

Having thus described my invention, what I claim as new and desire to secure by Letters Patent is:

A hydraulic torque converter comprising coacting vaned driving, driven and reaction members, a main shaft to which the driven member is connected, a tubular shaft for the reaction member concentric with and spaced from said main shaft to provide a fluid passage between them, bearings for said main and reaction member shafts disposed in spaced relation at the end of the reaction member shaft to provide a fluid discharge, said reaction member having ports between the vanes thereof located in the zone of the greatest pressure of the vortex and delivering to said passage between said shafts, a one-way brake for said reaction member shaft including a housing constituting a fluid chamber, an element of said overrunning clutch having vanes thereof subject to the fluid in said chamber, a sleeve carried by the driving member and disposed in concentric relation to the reaction member shaft to provide an annular fluid passage connection from said fluid chamber to the fluid intake of the driving member, and a fluid cooling unit provided with an inlet connection opening to said fluid discharge space between said bearings and a delivery connection to said fluid chamber.

HERBERT H. TRAIL.

REFERENCES CITED

The following references are of record in the file of this patent:

UNITED STATES PATENTS

| Number | Name | Date |
| --- | --- | --- |
| 1,923,404 | White | Aug. 22, 1933 |
| 1,970,236 | Kluge | Aug. 14, 1934 |
| 2,100,191 | Lapsley | Nov. 23, 1937 |
| 2,128,828 | Klepper | Aug. 30, 1938 |
| 2,143,312 | Griswold | Jan. 10, 1939 |
| 2,224,884 | Schneider | Dec. 17, 1940 |
| 2,241,764 | Böllinger | May 13, 1941 |
| 2,363,983 | Miller | Nov. 28, 1944 |

FOREIGN PATENTS

| Number | Country | Date |
| --- | --- | --- |
| 446,530 | Great Britain | 1936 |
| 687,658 | Germany | 1940 |